(12) United States Patent
Carmi

(10) Patent No.: US 9,904,517 B2
(45) Date of Patent: Feb. 27, 2018

(54) SYSTEM AND METHOD FOR AUTOMATIC MODELING OF AN APPLICATION

(75) Inventor: Adam Carmi, Petah Tiqwa (IL)

(73) Assignee: Applitools Ltd., Petach Tikva (IL)

( * ) Notice: Subject to any disclaimer, the term of this patent is extended or adjusted under 35 U.S.C. 154(b) by 800 days.

(21) Appl. No.: 13/607,845

(22) Filed: Sep. 10, 2012

(65) Prior Publication Data
US 2014/0074452 A1    Mar. 13, 2014

(51) Int. Cl.
| | | |
|---|---|---|
| G06F 11/34 | (2006.01) | |
| G06F 9/44 | (2018.01) | |
| G06F 11/30 | (2006.01) | |
| G06F 11/32 | (2006.01) | |
| G06F 3/0481 | (2013.01) | |
| G06F 9/455 | (2006.01) | |
| G06F 17/50 | (2006.01) | |

(52) U.S. Cl.
CPC .............. G06F 8/10 (2013.01); G06F 11/302 (2013.01); G06F 11/3089 (2013.01); G06F 11/323 (2013.01); G06F 2201/84 (2013.01); G06F 2201/865 (2013.01)

(58) Field of Classification Search
CPC ........ G06F 11/34; G06F 3/0481; G06F 9/455; G06F 11/3409; G06F 17/50; G06F 17/5022; G06F 17/5009
USPC ................................... 703/22; 715/704, 781
See application file for complete search history.

(56) References Cited

U.S. PATENT DOCUMENTS

| | | | |
|---|---|---|---|
| 6,175,864 B1 * | 1/2001 | Addison et al. .............. 709/219 |
| 6,766,311 B1 * | 7/2004 | Wall et al. ...................... 706/46 |
| 8,918,739 B2 * | 12/2014 | Butin et al. .................... 715/825 |
| 2003/0097640 A1 * | 5/2003 | Abrams et al. ............... 715/530 |
| 2004/0107414 A1 * | 6/2004 | Bronicki et al. .............. 717/105 |
| 2005/0021289 A1 * | 1/2005 | Robertson et al. ........... 702/182 |
| 2005/0080600 A1 * | 4/2005 | Courtay ............................ 703/2 |
| 2006/0184880 A1 * | 8/2006 | Bala .............................. 715/705 |
| 2008/0109714 A1 * | 5/2008 | Kumar et al. ................. 715/234 |
| 2008/0250339 A1 * | 10/2008 | Riggs et al. .................. 715/771 |
| 2009/0031227 A1 | 1/2009 | Chakrabarti et al. |
| 2009/0293004 A1 * | 11/2009 | Emam et al. .................. 715/762 |
| 2010/0095208 A1 * | 4/2010 | White et al. .................. 715/704 |
| 2010/0115417 A1 * | 5/2010 | Cox et al. ..................... 715/740 |
| 2010/0235808 A1 * | 9/2010 | Dayan ................. G06F 11/3438 717/104 |
| 2010/0250478 A1 * | 9/2010 | Chen et al. ..................... 706/46 |

(Continued)

FOREIGN PATENT DOCUMENTS

EP           2228726       10/2010

OTHER PUBLICATIONS

Yeh et al., "Sikuli: Using GUI Screenshots for Search and Automation", 2009, <URL: http://francky.me/doc/nofd/sikuli-uist2009.pdf>.

Primary Examiner — Omar Fernandez Rivas
Assistant Examiner — Shiuh-Huei Ku
(74) Attorney, Agent, or Firm — Pearl Cohen Zedek Latzer Baratz LLP

(57) ABSTRACT

A system and method for automatically generating a displayable model of an application. A first and second screenshots of a first and second screens produced by an application may be captured and stored in a model. Transition information related to a transition from the first to the second screen may be obtained and stored in the model. A session may be recorded by recording screenshots and related events. Other embodiments are described and claimed.

20 Claims, 4 Drawing Sheets

(56) References Cited

U.S. PATENT DOCUMENTS

2011/0047514 A1* 2/2011 Butin .................... G06F 9/4446
  715/841
2011/0099491 A1  4/2011 Abraham et al.
2013/0004087 A1  1/2013 Kumar et al.

* cited by examiner

SYSTEM AND METHOD FOR AUTOMATIC MODELING OF AN APPLICATION

BACKGROUND OF THE INVENTION

Systems and methods for modeling applications are known. For example, manually selecting and storing images and other information to produce a model is known. Other methods for modeling an application include inspecting the code structure of an application and producing a model of the source code, e.g., in the form of a flow chart or class diagrams.

However, current systems and methods suffer from a number of drawbacks. For example, manually generating a model may be time and effort consuming. Other modeling methods are tightly coupled to the implementation of the application being modeled and/or require cooperation with a developer of the application. Accordingly, current systems and methods are unsuitable and are impractical when modeling applications that have large number of states and screens or when screens are added or removed when an application evolves.

SUMMARY OF EMBODIMENTS OF THE INVENTION

Embodiments of the invention may include a system and method for automatically generating a displayable model of an application. A method according to embodiments of the invention may model an application based on data displayed by the application. A method according to embodiments of the invention may model an application based on graphical user interface (GUI) events and information. A method may include capturing a first screenshot of a first screen produced by an application, capturing a second screenshot of a second screen produced by the application, determining at least one of the first and second screens is not represented in the displayable model, and, storing in the displayable model the first and second screenshots and transition information related to a transition from the first screen to the second screen. A model may be interactive and a method may include displaying a first screenshot included in the model, capturing an event related to an interaction with the displayed screenshot, and, based on the event and transition information in the model, selecting to present a second screenshot included in the model.

A parameter may be stored in association with a screenshot in a model. The parameter may be provided to an external system that may perform an action based on the parameter. A session (e.g., a sequence or set of screens and related GUI events) may be recorded by recording screenshots, information related to events and metadata related to the screenshots. A difference between a first and second models or recorded sessions may be graphically presented. A session may be verified in real-time based on a model or based on a recorded session. An application may be automatically interacted with based on information in a model or in a recorded a session. An event may be generated upon detecting a predefined condition based on screenshots and events related to an execution of an application and based on information in a model. An application may be verified for compatibility adherence or consistency with a model based on screenshots produced by the application and based on screenshots in the model. An application may be verified for compatibility with a model based on transition information and metadata in the model.

A model may be updated or modified and modifications of a model may be marked or recorded. A user may be prompted to approve or reject modifications to a model. A state of an application may be determined based on relating a screen produced by the application to information in a model. A state of an application may be graphically represented and/or presented. A difference between a first and second models may be graphically displayed.

A screen produced by an application may be associated with a screenshot included in a model, an event related to the screen may be identified and a subsequent screen expected to be produced by the application based on the event and based on transition information associated with the screenshot may be determined.

Summary information may be produced based on data related to a plurality of interactions with the application and based on a model. Summary information may be graphically displayed. A screen produced by an application may be represented based on two or more screenshots in a model. Compatibility, adherence or consistency with a model may be determined, in real-time, based on screenshots obtained from an application and based on data in a model. An updated model may be generated based on received screenshots and a difference between a model and a related updated model may be graphically presented. A matching of a screen produced by an application with a screenshot included in a model may be indicated in real-time. Screenshots included in a model may be sorted based on an associated attribute and a received screenshot may be matched with screenshots in the model based on the based on the sorting.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
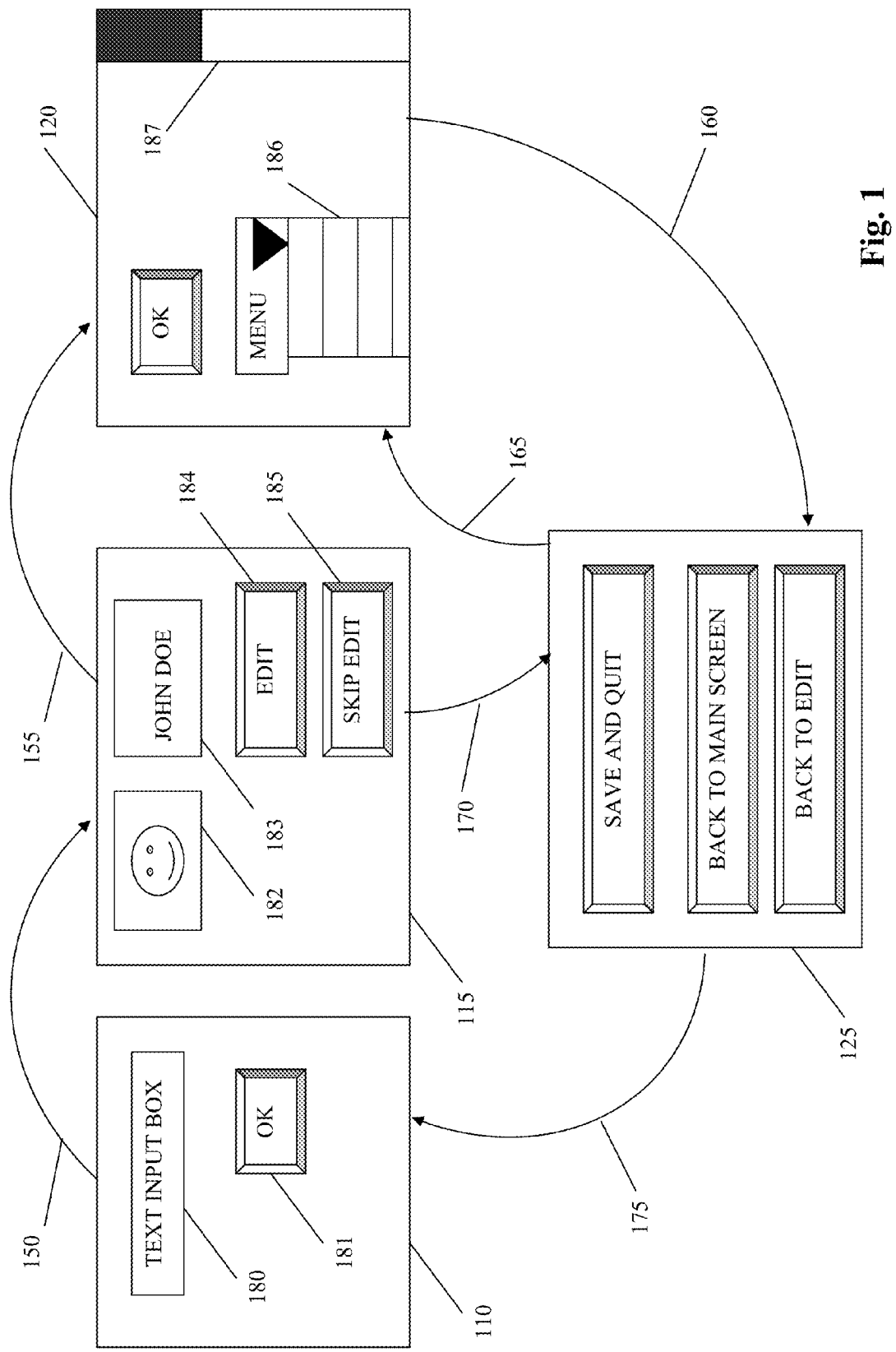
FIG. 1 shows a schematic diagram of exemplary screens and flows related to an application according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

According to embodiments of the invention, a model of an application may be automatically generated and used in various ways as described herein. A model may include screenshots of screens produced by an application and additional, related information. The term "screen" (or "screens") used herein may refer to any data displayed by an application, e.g., in a window covering part of a display screen or the entire display screen. For example, a screen may be an image of a calculator displayed on a display of a computing device by a calculator application.

As referred to herein, a first and second screens may be any two screens selected from a plurality of screens displayed by an application. Accordingly, as referred to herein, a second screen is not necessarily presented immediately (or otherwise) after a first screen, and a first screen may not necessarily be the first screen presented by the calculator application, e.g., a first screen as referred to herein may be a screen displayed after a number of screens have been displayed, e.g., in a session or flow as described herein.

In some embodiments, transition information related to a transition (or flow) from a first screen to a second screen may be included in the model. It will be understood that when a first and second entities are referred to herein, these entities may be any two entities included in a set of a plurality of entities. For example, first and second screens as referred to herein may refer to the fifth and seventh screens displayed by an application when executed. Other information included in a model may be related to events, e.g., mouse clicks, keyboard keys pressed or other interactions with an application that may cause the application to replace or change screens being presented. Other information included in a model may be related to screen attributes, a context, a state of an application, a duration, elapsed time or any other relevant aspect. Yet other information included in a model may be related to graphical user interface (GUI) elements, items or objects, e.g., in images, buttons, text boxes, etc. that may appear in a window or screen.

Reference is now made to FIG. 1 which shows a schematic diagram of exemplary screens and transitions or flows involving the screens. Although embodiments of the invention are not limited in this regard, the term "transition" as referred to herein should be expansively and broadly construed to include any sequential, successional, or other presentation of two screens. For example, a replacement, on a display screen of a computing device, of screen 110 by screen 115 may be referred to herein as a transition related to, involving, or including, screens screen 110 and screen 115 or, in short, a transition from 110 to screen 115. The term "flow" as referred to herein should be expansively and broadly construed to include any, possibly sequential, presentation of two or more screens and related events. For example, a presentation of screen 110, a click on button 181 and a subsequent presentation of screen 115 may be referred to herein as a flow related to, involving, or including, screens 110 and 115 and an event. In some embodiments or cases, a flow may not include events. For example, a flow may represent transitions from screens to other screens that may not be related to an interaction of a user or other events but, for example, may be caused by an application, e.g., based on time elapsed or other conditions.

Although embodiments of the invention are not limited in this regard, the term "session" used herein should be expansively and broadly construed to include any sequence of one or more interactions with an application and/or screens produced by the application. For example, a session may be, or may include, a presentation of screen 110, a click on button 181 and a presentation of screen 115. A session may be related to an interaction of a user with an application, accordingly, a session may be related to a set of events, e.g., a set of user actions, or interactions with screens, and the presentation of the related screens. Otherwise described, a session as referred to herein may include any information related to a dialog between user and a computer or application or between a first and second applications. For example, any action performed by a user, and response or screen provided by an application, may be viewed as part of a session. A session may include one or more flows. Typically, a session may be related to an interaction with an application that may include performing one or more tasks, e.g., a registration of a user, a testing of a component and so on.

For example, the screens shown in FIG. 1 may be produced by an application that may enable viewing and/or editing a user profile. As shown, a first screen 110 may be produced by an application. In an embodiment and as shown, screen 110 may include a text input box 180 that may be used for entering a name and a button 181 labeled "OK". In an exemplary flow, a user may enter a name in text input box 180 and then press button 181 in order to proceed, e.g., cause a search for the user profile in a database and/or be provided with additional screens as described and shown.

As shown by arrow 150, a flow may include a transition from screen 110 to screen 115. For example, a transition may be a replacement (caused by the application) of screen 110 by screen 115. As shown, screen 115 may include image 182 (e.g., a picture of the relevant user), label 183 (e.g., the user name) button 184 labeled "EDIT" and button 185 labeled "SKIP EDIT". As shown by arrows 155 and 170, a first flow or transition may include a transition from screen 115 to screen 120 (or a replacement of screen 115 by screen 120) and a second flow may include a transition from screen 115 to screen 125. For example, following a click on button 184 ("EDIT") in screen 115, screen 120 may be produced, displayed or provided by the application, e.g., in order to enable modifying a user profile. Alternatively, pressing button 185 ("SKIP EDIT") in screen 115 may cause a transition to screen 125. Similarly and as shown, a transition from screen 120 to screen 125 may be caused by the application, e.g., when a user is done editing a profile using menu 186 in screen 120 and further presses the "OK" button in screen 120. A screen may not fully display all items in the screen. For example and as shown, menu 186 may not be fully presented in a first screen but, using scroll bar 187, a screen fully presenting menu 186 may be provided.

As shown, the flow may include a transition (or returning) from a screen to a previous screen. For example and as shown by 165, by pressing the button labeled "BACK TO EDIT" shown in screen 125, a transition from screen 125 back to screen 120 may occur. Similarly, pressing the button labeled "BACK TO MAIN SCREEN" in screen 125 may cause the application to provide screen 110 subsequent to providing screen 125 as shown by 175. It will be understood that for the sake of clarity, the screens shown in FIG. 1 and items therein are simplified exemplary screens and items, and that any screens, including any items, may be applicable. For example, any GUI items, objects or elements may be included in screens discussed herein. For the sake of simplicity and clarity, FIG. 1 shows a limited number of screens, items in screens and flows, however, it will be understood that any number of flows and screens (including any number of items) may be applicable. In fact, embodiments of the invention may be particularly suitable for modeling applications that have large number of screens and possible flows.

According to embodiments of the invention, screenshots of screens produced by an application may be automatically captured and stored in a model. For example, a first and second screenshots of a respective first and second screens (e.g., screenshots of screens 120 and 125) produced by a first application may be automatically captured by a module, unit or second application, and may be stored in a model. A screenshot of a screen as referred to herein may include any information usable to render, display or present the screen on a display of a computing device. A screenshot of a screen as referred to herein may be, or may include, a bitmap, an array or set of values or parameters representing pixels, or any other information, data or parameter that may represent a screen produced by an application and/or usable to present or reproduce the screen.

Screenshots may be obtained from any applicable source using any system or method. For example, screenshots of screens produced by an application may be obtained from the application itself, from a video or expansion adapter, from an operating system or from a graphics card or board. Screenshots of screens produced by an application may be obtained using an application programming interface (API), e.g., graphics device interface (GDI), or directly from a device or component (e.g., a monitor, chip or card). It will be understood that embodiments of the invention are not limited by the method and/or system used to obtain screenshots of screens produced by an application. Any method of capturing screenshots may be used without departing from the scope of the present invention.

Capturing a screenshot of a screen may include determining a screen associated with the screenshot is stable, e.g., unchanged for a predefined period of time. Embodiments of the invention may obtain information from any applicable source or use any method in order to determine a screen is stable. For example, a capturing unit may interact with the application that produces a screen in order to determine that the screen is stable (e.g., the application is not modifying the screen) and may only capture a screenshot of the screen when informed the screen is stable. In other cases, a screenshot capturing unit may interact with a dedicated hardware component (e.g., a graphics subsystem) in order to determine a screen is stable, e.g., not being modified for a predefined period of time. In yet other embodiments, a sequence of screenshots of a screen may be captured (e.g., five screenshots per second may be obtained), and the sequence of screenshots may be used to determine the screen is stable, e.g., by determining a difference between a first and second screenshots in the sequence is below a predefined threshold. It will be understood that embodiments of the invention are not limited by the system or method used for capturing screenshots nor by the method or system used to determine a screen is stable.

In an embodiment, determining a screen is stable may be based on determining a portion or region of the screen is stable. Otherwise described, an embodiment may determine a screen is stable based on only a portion, section or region of the screen. For example, upon identifying or determining a portion of a screen is constantly changing or is otherwise unstable, an embodiment of the invention may exclude the unstable portion from consideration and may determine the screen is stable based on portions of the screen other than the unstable portion or region. For example, a region or section of a screen dedicated to banners or animated commercial content may be excluded from consideration or data used in order to determine a screen is stable. In other cases, a blinking cursor may be identified and may be excluded from considerations related to a stability of a screen. Accordingly, an embodiment may determine a screen is stable by masking out an unstable portion or region of a screen (e.g., an area dedicated animations, blink effects and the like) and examining or considering areas or portions of the screen other than the masked out area or portion.

Figure 2:
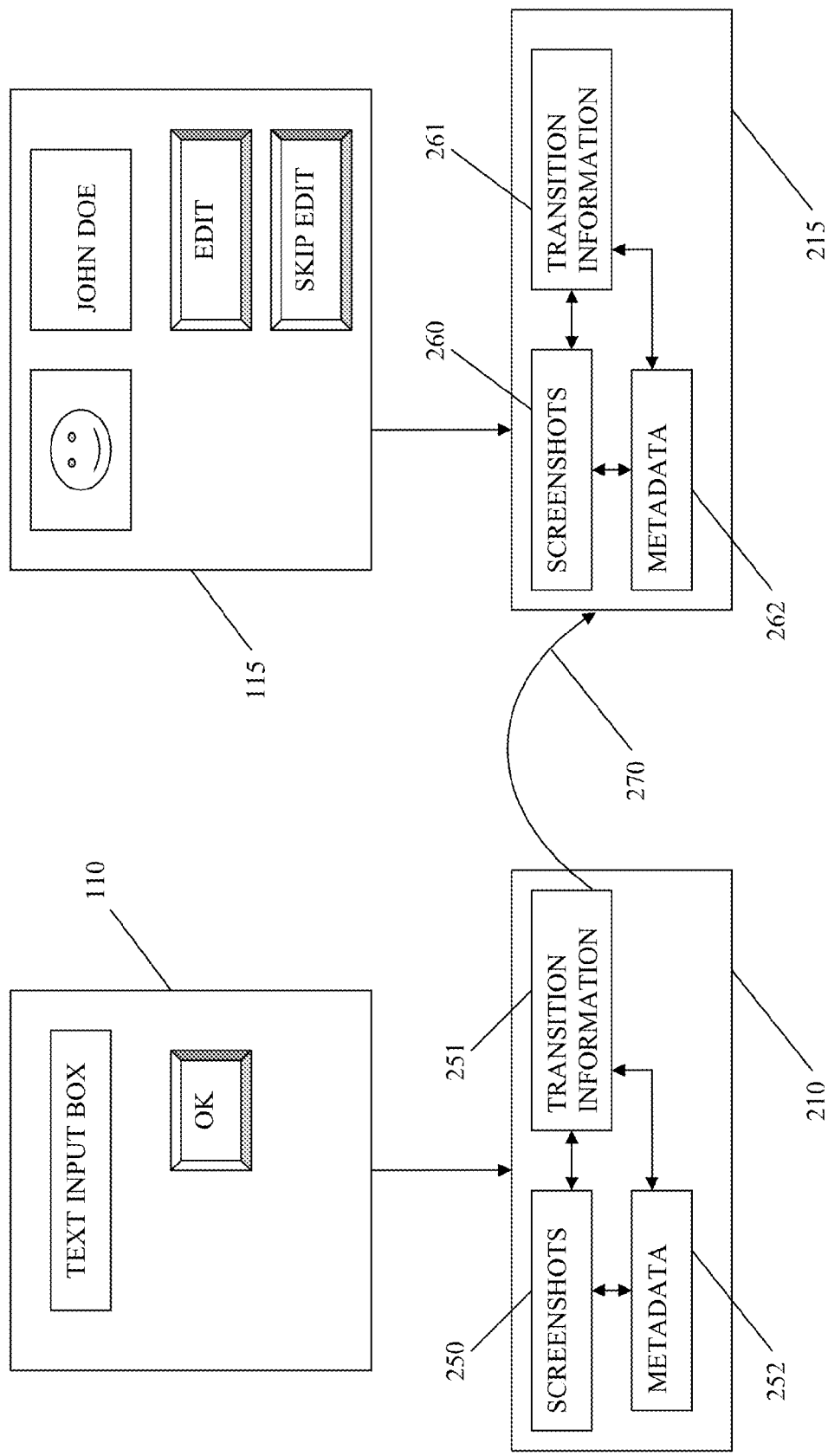
FIG. 2 schematically shows a representation of screens and related data in a model according to embodiments of the invention.

Reference is now made to FIG. 2 which schematically shows a representation of screens and related information or data in a model according to embodiments of the invention. As shown by 210 and 215, a model may include a screenshot, metadata and transition information. For example, screen 110 may be represented by, related to, or associated with screenshots 250 that may include one or more screenshots. Other modeling aspects related to screen 110 may be included in transition information 251 and metadata 252. Similarly, screen 115 and related aspects may be represented by screenshots 260 (that may include one or more screenshots), transition information 261 and metadata 262. As shown by 270, a transition or flow from screen 110 to screen 115 may be represented in a model. For example, transition information 251 (possibly referencing metadata 252) may include information related to a transition from screen 110 to screen 115. For example, transition information 251 may include a reference to 215 or any object included in 215. Metadata 252 may include any information, data or parameters related to screen 110, screenshots 250 and/or transition information 251. Transition information 251 may include any information related to a transition from screen 110 to another screen, e.g. and as shown by 270, to screen 115. Screenshots 250 and 260 may be screenshots of screens 110 and 115 respectively.

Although in some cases, a single screenshot may suffice in order to graphically represent a screen, in some cases more than one screenshot may be used. For example, a screen produced by an application may only reveal a part of a larger panel or screen. For example, a first screen or window displayed by an application may be resized and made smaller such that a resulting second screen or window only displays part of the information displayed in the first window. In such or other cases, scrollbars may be added to enable a user to scroll through the entire panel. Accordingly, screenshots 250 and 260 may include a number of screenshots that may provide different views or portions of a larger panel or screen. For example, a viewport having a size and/or shape may be defined and portions of a large screen may be presented through the viewport. Embodiments of the invention may store, e.g., in screenshots 250, a number of screenshots (e.g., as shown by screenshots 250 and 260) that may represent a respective number of views that may be related to the same screen, e.g., a number of views provided by a viewport. When comparing or otherwise relating a captured screenshot to screenshots in a model or recorded session as described herein, the captured screenshot may be compared or related to a number of screenshots so that the portion visible through a viewport may be identified.

For example and as shown in FIG. 1, screen 120 may be a viewport into a larger panel or window that includes the button labeled "OK" and menu 186 as shown. As shown, in the viewport, menu 186 may not by fully visible. However, using scrollbar 187, other portions of the underlying screen, window or panel may be revealed or presented in the viewport. For example, in order to see menu 186 in full, a user may use scrollbar 187 to scroll down. In such exemplary case, an embodiment may capture and store a number of screenshots that represent a respective number of views of an underlying panel, screen or window. A number of screenshots associated with a viewport may be used in order to identify or determine an entire screen produced by an application. A number of screenshots associated with a viewport may be used in order to determine attributes of a large window or panel when only a portion of the window or panel is exposed in the viewport. Loosely described, an embodiment may use a number of screenshots as pieces of a jigsaw puzzle in order to determine the complete representation of a screen, window or panel. Accordingly, any screenshot of a portion of the window obtained at a later stage may be related to a window or screen determined as described herein.

For example, after capturing a number of different views of screen 120 achieved by dragging scrollbar 187, an entire view of an underlying panel may be determined. For example, an object similar to screenshots 250 may include screenshots of some or all views of screen 120. Accordingly, any view achieved by any position of scrollbar 187 may later be identified or determined as related to screen 120. Any algorithm or method may be used in order to associate a screenshot of a viewport to a set of screenshots representing a window or panel. For example, by compiling a representation of an entire screen, window or panel presented by an application based on a plurality of screenshots of portions of the entire screen or window, provided with a screenshot of a portion of the window, an embodiment may identify the provided screenshot as being part of the entire screen. Accordingly, an embodiment may identify a screen produced by an application even if only a portion of the screen is provided, e.g., through a viewport.

Control information related to a screen displayed in a viewport, e.g., a location of a button in the screen, may be recorded with respect to an underlying panel or window. For example, although the location or coordinates of a button that may be visible in a number of views in a viewport may be different in each of the views (e.g., the button may be at the top of a first view and at the bottom of a second view), the recorded location of the button may be with respect to the underlying panel, portions of which are presented in the different views.

Transition information related to a transition from a first screen to a second screen may be obtained, determined and/or derived by a module, unit or application. Transition information may be analyzed or processed, and may be stored, in the model or elsewhere, in association with the relevant screenshots. For example, screenshots 250 and 260 of screens 110 and 115 may be captured or otherwise obtained, and any transition information related to a transition from screen 110 to screen 115 may be obtained and stored in association with screenshots of screens 110 and/or 115, e.g., as shown by 251 and 261. Transition information may be any information usable to reference, represent, simulate and/or reproduce a transition from a first screen to a second screen, e.g., a transition from screen 110 to screen 115.

Transition information may include, or be related to, an event that caused the transition. For example, an event may be a click on button 181 ("OK") in screen 110 that may cause the application to replace screen 110 with screen 115, accordingly, a click on button 181 in screen 110 may be identified as an event that may be stored in association with a screenshot of screen 110 (e.g., in transition information 215) and the event may further be associated with a transition from screen 110 to screen 115 (e.g., as shown by 270).

Embodiments of the invention may identify an event related to a first and second screens and may include information related to the event in the transition information. For example, transition information may include an event and a reference to an item. For example, transition information related to a transition from screen 110 to screen 115 may include a reference to screenshots of screens 110 and 115, information related to a mouse click and a reference to button 181. For example and as described herein, metadata 252 associated with a screenshot of screen 110 may include information related to button 181, including an identification parameter, and transition information related to a transition from screen 110 to screen 115 may include a reference to the identification parameter.

According to embodiments of the invention, a screenshot may be stored in a model if it is not already included or represented in the model. For example, upon receiving, capturing or otherwise obtaining a new screenshot, a module, unit, or application may examine screenshots included in a model in order to determine whether the new screenshot is already included or represented in the model. If it is determined that a screenshot is not included or represented in the model, the screenshot may be added to the model. Accordingly, a specific screen produced by an application may be represented once in a model even if the screen appears a number of times in a flow. For example, in order to represent or store a flow from screen 120 to screen 125 and back to screen 120 (as shown by arrows 160 and 165), a model may only store one representation for each of screens 120 and 125 and further store transition information such that the flow may be represented, tracked, displayed or reproduced.

In some embodiments, cases or scenarios, a first and second screenshots of a respective first and second screens may be obtained and, following an examination of a model, it may be determined that the screens are already represented in the model, e.g., by screenshots already included in the model. In such or other cases, an embodiment may further check if the specific flow or transition involving the first and second screens is represented in the model. If it is determined that the flow is not represented in the model, then transition information related to a transition from the first screen to the second screen may be added to the model, in association with the already represented screens.

For example, screens 120 and 125 may be represented or included in a model and the model may further include transition information related to a transition as shown by arrow 160. However, a transition from screen 125 to screen 120 as shown by arrow 165 may not yet be represented or included in the model. Accordingly, upon detecting a transition from screen 125 to screen 120 as shown by arrow 165, an embodiment may add (e.g., in association with a screenshot representing screen 125) transition information representing the transition shown by arrow 165. Accordingly, transition information may be added to a model with respect to screens already represented in the model, possibly without adding or modifying screenshots in the model. For example, upon identifying or detecting a transition from screen 110 to screen 115, transition information 251 may be updated in order to reflect or represent the transition, even if screenshots 250 and 260 are already stored or represented in a model. Accordingly, flows and transitions involving screens represented in a model may be dynamically updated, added or modified in the model, possibly without altering a representation of the screens.

In some embodiments, a reference to displayable data may be stored. For example, instead of, or in addition to a screenshot, a reference to a stored screenshot may be included in a model. In another exemplary embodiment, a uniform resource locator (URL) may be used as further described herein. Any operation related to a screenshot as described herein may be applied to displayable data for which a reference is stored. Accordingly, it will be understood that a discussion of a screenshot herein may be relevant to references to a screenshot.

As described, a representation of a screen and related events (e.g., as shown by 210 and 215) may include a pointer, link or other reference. For example, a URL may be included in representation 210. For example, in an embodiment, an application modeled, monitored or tracked may be a web browser. In such case, generating a model (or recording a session) may include storing one or more URLs used by a web browsing application. URLs may be used to model an application, record a session and monitor an execution. For example, instead of, or in addition to, recording screenshots as described herein, a URL may be recorded in a model or recorded session.

Operations and methods described herein may include searching for a screenshot in a model or recorded session or matching a captured screenshot with one or more screenshots in a model or recorded session. According to embodiments of the invention, rather than simply examining all screenshots in a model in order to find a matching or other screenshot, information in the model or recorded session may be used in order to quickly and efficiently find a screenshot. For example, given a captured screenshot for which a match in a model is needed, a title in the screenshot may be identified and screenshots in a model may be sorted according to a match level based on the title. For example, screenshots including a title which is the same or close to the title in the screenshot. For example, screenshot including a title which is identical to the title in the captured screenshot may be placed at the top of a prioritized list, followed by screenshot that include a title having the same length as the title in the captured screenshot and so on. In other examples, a list of candidate or potential screenshots may be prioritized according to a size of a window in a screenshot, e.g., screenshot including a window having the same (or close) size of a window in the captured screenshot may be placed higher in a prioritized list.

In yet other examples, e.g., when the application modeled is a web browsing application (e.g., a web browser as known in the art) a URL obtained from the browser may be matched against a set of URLs stored in a model or recorded session, a match level may be calculated for each of the URLs in the set and the URL associated with the highest matching level may be selected or the URLs in the model may be included in a sorted list according to their respective matching level.

By sorting or prioritizing potential screenshots as described herein, real-time and/or speed of operation may be served. For example, an application may produce hundreds or thousands of screens, accordingly, provided with a screenshot of a screen, identifying the screen (or its representation) in a model may involve examining or considering a very large number of screens. Rather than considering all possible screens in a model, an embodiment may improve the process by sorting potential screens according to a priority that may be calculated using any applicable information as described herein. Accordingly, the list of potential or candidate screens to be considered may be reduced. Sorting screenshots (or representations of screens) as described herein may be performed whenever applicable, e.g., when searching for a match in a model as described herein, when determining an expected screen etc. It will be understood that any method for sorting or prioritizing screenshots or other elements in a model or recorded session may be used, including any sorting or prioritizing methods known in the art. Any criteria may be used, e.g., any attribute of a screenshot such as, but not limited to, size, shape, color, fonts and the like may be used in order to sort screenshots according to a matching level. Any method for speeding a sorting process may be used. For example, metadata associated with screenshots as described herein may include a size, shape, color or any attribute of the associated screenshot that may be used by a sorting process when searching for a match or sorting screenshots as described herein.

A model may be tightly coupled to a specific flow, may be related to, or may represent, a number of specific flows, or may be related to an undefined or unlimited number of flows. A model tightly coupled to a specific flow may include screenshots of screens included in the specific flow and transition information related to transitions included in the specific flow. Similarly, a model related to a number of specific flows may include similar information or data related to the specific flows. A model related to an undefined or unlimited number of flows may generally include all known, identified or possible flows involving all identified or known screens and transitions.

Metadata may be associated with one or more screenshots in a model. Metadata associated with a screenshot in a model may be related to, or obtained from, any component, subsystem, application or entity. For example, metadata may be received from an operating system, from a graphics system or from the application producing the screens for which screenshots are captured. Metadata associated with a screenshot may be a product or result of processing or analyzing any data, parameters or information, e.g., analysis and/or processing of information received from an operating system, from a graphics system or from the application producing the screens.

In an embodiment, screenshots and related data may be examined, analyzed or otherwise processed. For example, any data, parameter or information related to an operating system, virtual machine (VM) or the application that produces the screens for which screenshots are obtained may be analyzed, examined or processed. Processing or analysis results related to a screenshot may be included in metadata and transition information that may be associated with the analyzed screenshot and may be stored, in association with the screenshot, in a model. Items or objects in a screen (or related screenshot) may be identified, recognized, classified or categorized and information or parameters identifying items and/or their attributes, may be included in metadata that may be associated with an examined screenshot. Accordingly, metadata associated with a screenshot may include any information related to items in the screenshot.

An embodiment may determine that a screen includes one or more items and may represent the items in a model or recorded session by one or more parameters. For example, it may be determined that screen 110 includes two items and the location and size of the items may be determined and recorded in a model. In order to model an application, a limited number of parameters may be required in order to represent items in a screen. For example, it may suffice to record a size and location of items in a screen in order to model an application. For example, by noting that an item is located in a specific location within a screen, identifying (and recording) a click on the item and identifying a subsequent screen produced, an embodiment may model an application, even without fully identifying the items in the screens produced. Accordingly, in an embodiment, screenshots and events related to an area in a screen may suffice in order to model an application.

For example, using screenshots and events in a model as described herein, an application may be modeled even if the functionality or other attributes of elements included in screens are not determined. For example, a flow of screens and events may be recorded and reproduced using screenshots and click or other events but without any additional information related to the buttons being clicked. For example, by noting and recording that a click on (a possibly unidentified) item located where button 181 is shown in screen 110 causes a transition to screen 115, using screenshots of screens 110 and 115, the application may be modeled and/or a flow including screen 110, a click on button 181 and a display of screen 115 may be recorded, graphically reproduced and/or used in order to verify an execution of the application. Accordingly, embodiments of the invention may enable modeling an application and recording sessions using only graphical information and high level event data (e.g., a click and a coordinate on a screen).

In other embodiments, cases or scenarios, items in a screen may be analyzed and their attributes may be determined and recorded. For example, GUI elements such as buttons, menus, input fields, images and the like may be recognized, identified, classified or categorized. Size, location (e.g., represented in relative coordinates with respect to the screen's borders), callback, color, functionality or any other attribute or aspect of elements, items or objects in a screen (or related screenshot) may be identified or determined. For example, based on its shape and size, button 181 in screen 110 may be identified as a clickable button. In other embodiments or examples, an API of a button (or other data) may be obtained (e.g., from an operating system or an application) and attributes or other relevant aspects of a button or other GUI object may be determined. Text or labels in or on items may be identified, e.g. using optical character recognition (OCR). For example, aspects related to button 181 may be determined based on the text ("OK") on button 181. Any other algorithms, methods, processing or analysis may be applied in order to identify, recognize, classify or categorize GUI or other items in a screen or related screenshot. Any information related to items in a screenshot (or screen), e.g., determined as described herein, may be included in metadata associated with the screenshot. For example, metadata 252 may include any relevant information related to button 181 as described herein. In addition, metadata 252 may include an association of an identification parameter or value that may be used (e.g., in transition information 251) in order to reference button 181.

Metadata associated with a screenshot in a model may include any information or parameters describing elements in a screen. For example, metadata associated with a screenshot may identify a type of each item in a screen, e.g., a clickable button, a pull down menu, a text input box, an image, a label etc. Metadata may include, for one or more items, the location of the item in the screen, an indication whether or not the item may assume different locations, shape or size etc. In an embodiment, metadata associated with a screenshot in a model may include entries or records for some or all items or objects in the screenshot (and related screen). For example, an entry for an item or object may include an identification parameter or value, a type, a location, one or more categories with which the item is associated, a list of events that may be related to the item or any other relevant information.

Metadata associated with an examined screenshot may include information related to the relevant screen itself (or the related screenshot). For example, size, shape, location, borders, color or other attributes of a screen may be included in metadata associated with the screen or the related screenshot. For example, metadata 262 may include information related to the size and borders of screen 115, the number of items in screen 115 etc.

A screenshot, metadata and/or transition information may include links, pointers or other references to the same or other screenshot, metadata and/or transition information. For example, transition information 251 associated with screenshots 250 may include an identification of, or other reference to, data or parameter in metadata 252 associated with screenshots 250. Transition information 251 associated with screenshots 250 may include an identification of, or other reference to, data or parameter in metadata 262 associated with screenshots 260 or it may include a reference to 215 or any element included therein.

For example, metadata 252 associated with screenshots 250 may include an identification value for button 181. Transition information 251 associated with screenshots 250 and related to a transition from screen 110 to screen 115 (as shown by 270) may include information representing a mouse click (an event) and the identification value of button 181 or a reference to an entry of button 181 in metadata 252. Transition information associated with a screenshot of screen 110 may further include a reference to one or more of screenshots 260 or generally to 215. Accordingly, a transition from screen 110 to screen 115 as shown by arrow 150 may be represented in a model by references to screenshots 250 and 260, an event (e.g., stored or recorded in transition information 251) and an item associated with the event, e.g., an identification of button 181 stored in metadata 252.

Accordingly, any transition or flow from a first to a second screen may be represented in a model in a way that enables tracking, displaying or reproducing the flow. For example, an application that provides hundreds of screens where thousands of different flows or transitions between the screens are possible, may be modeled as described herein, wherein the modeling may include screenshots and information related to events, transition and flows as described herein. As described and shown, for each screen, a model may include a screenshot, metadata related to the screen and transition information related to possible transitions from the screen to other screens. Accordingly, tracking, debugging, verifying, displaying (or otherwise reproducing) screens, sessions, flows and/or transitions are enabled by embodiments of the invention.

Various systems and methods for recording screen or other related information are known in the art. Typically, in order to record information related to an execution of an application, known systems interact with an operating system and other components in a computing device in order to receive relevant information and information received is then stored. However, as known, even a simple move and click of a mouse may generate a large number of events, e.g., a large number of coordinate sets, interrupts, a "button down" event, a "button up" event, a "click" event and so on. Generally, events provided by an operating system may be categorized to low level events (e.g., "mouse down" and "mouse up") and high level events (e.g., a "click" event). Other event types or categories exist. Existing recording systems and methods either records all events, only low level events, or only high level events. However, current systems and methods do not enable selectively recording events for a screen or for an element or object within a screen.

For example, it may be that, as designed or programmed, button 181 is activated by low level events (e.g., a "mouse down" followed by a "mouse up" events) and button 184 in screen 115 is activated by a high level event (e.g., a "click" event). Accordingly, in order to correctly interact with the application that produces screens 110 and 115, the correct events must be provided with respect to the relevant items. For example, in the above example, simulating or providing a "click" event to button 181 will not properly activate button 181 since, as programmed or implemented, button 181 requires the "mouse down" followed by a "mouse up" events in order to be activated.

Embodiments of the invention enable selectively recording events associated with a screen, or object in a screen, at any level or granularity based on a configuration. For example, in the above exemplary case involving buttons 181 and 184, a user may select button 181 in a model (e.g., by selecting a screenshot representing screen 110 in a model and further selecting button 181 therein) and may further indicate (e.g., using a selection menu) that a recording related to button 181 is to be low level. In the above exemplary case, the user may similarly configure recording related to button 184 as high level. Accordingly, when a session is subsequently recorded based on the model, an embodiment may examine the configuration parameters provided by the user (as stored in a relevant model) and automatically store low level events for button 181 and high level events for button 184. Accordingly, when a recorded session is replayed, the proper events will be provided to buttons 181 and 184, e.g., to activate button 181 based on a recorded session, low level events (e.g., a "mouse down" followed by a "mouse up") will be produced and to activate button 184 based on the recorded session, a high level event (e.g., a "click" event) will be produced or provided to button 184 by a system according to embodiments of the invention. Accordingly, to record a session based on a model, embodiments of the invention may only store required events for objects interacted with. To record a session, embodiments of the invention may selectively store selected events for an object or screen based on a configuration. It will be understood that the above exemplary case involving low and high level events is a simplified example and that any criteria, rule or parameter may be used in order to selectively store events when recording a session and that any relevant configuration parameter may be configured, e.g., in a model in order to cause a selective storage of data when recording a session as described herein.

Figure 3:
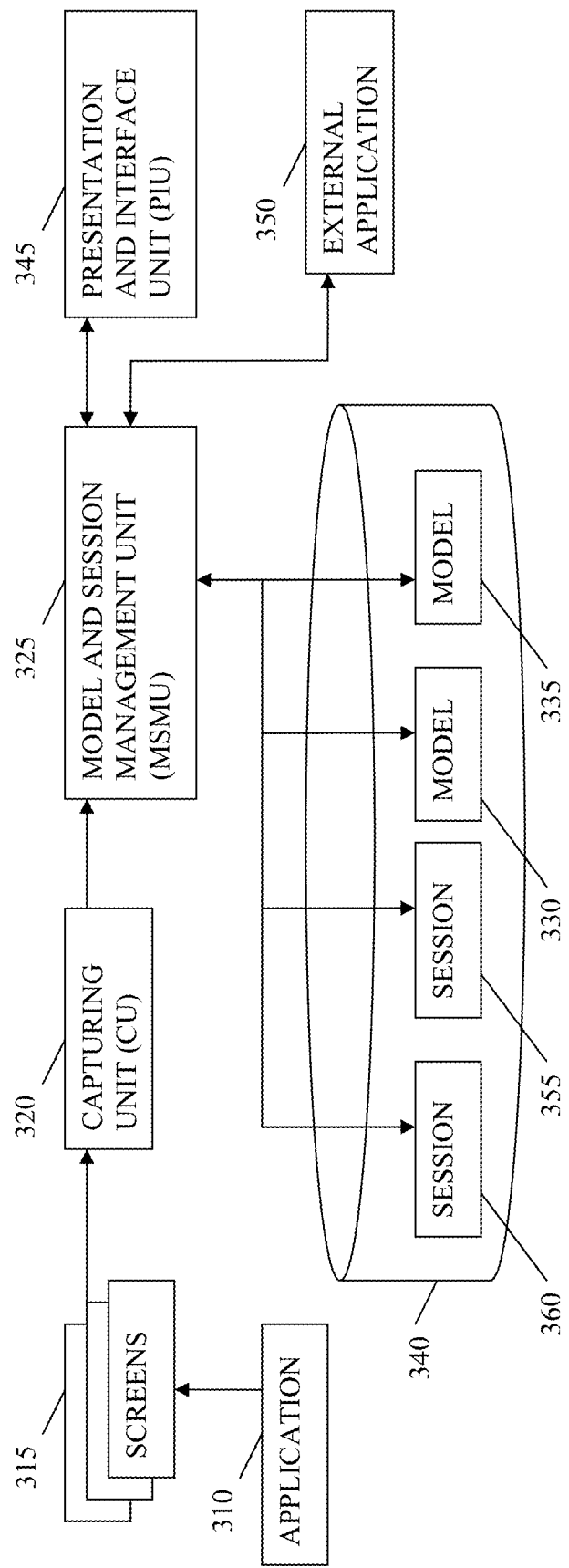
FIG. 3 is a high level schematic block diagram of a system according to embodiments of the invention.

Reference is now made to FIG. 3 which shows a high level schematic block diagram of a system according to embodiments of the invention. As shown, a system may include a capturing unit (CU) 320, a model and session management unit (MSMU) 325, a presentation and interface unit (PIU) 345 and storage 340. As further shown, models 330 and 335 and recorded sessions 355 and 360 may be stored in storage 340. CU 320 may capture and provide screenshots of screens 315 produced by application 310. CU 320 may provide screenshots to MSMU 325.

As described herein, CU 320 may capture or otherwise obtain any relevant information and provide obtained information to MSMU 325. CU 320 may capture any event related to screens 315 and provide related information to MSMU 325. For example, mouse clicks or mouse hovering over a GUI object may be detected and/or captured by CU 320. Other events captured by CU 320 may be a keyboard being pressed, a touch-screen being interacted with, or an interaction of an application (not shown) with application 310. Yet other events captured by CU 320 may be related to, or generated by, an operating system (e.g., a software interrupt), an underlying hardware (e.g., a hardware interrupt). Generally, any relevant event may be captured by CU 320 using any method, e.g., as known in the art.

Application 310 may be any application that provides, produces, presents or displays screens 315. For example, screens 315 may be rendered on a display screen of a computing device. Any graphical output, in any format, may be obtained. For example, screens 315 may be stored (e.g., by application 310) in a file or memory. In other embodiments, e.g., when running a number of applications on a number of virtual machines (VMs) on a single physical machine, screen output may be sampled or obtained from a VM that may not be associated with an actual or physical display screen. It will be understood that embodiments of the invention are not limited by the type, system or method used for generating or providing application screens.

Any input and/or output to/from an application may be captured and used. It will be noted that input or output may be captured from or by physical and/or virtual devices or entities. For example, virtual devices as known in the art may be interacted with in order to capture information directed to or originated from an application. For example, an application modeled or monitored as described herein may be executed inside a hosting application (e.g., a browser engine) in which case related input and output may be obtained using an API of the hosting application (e.g., the browser). Accordingly, an embodiment may include modeling and/or monitoring a number of applications at the same time on a single physical machine (e.g., a VM).

Screens 315 may include any items, elements or objects as discussed herein. For the sake of simplicity and clarity, only two models (330 and 335) are shown in FIG. 3, however, it will be understood that embodiments of the invention may store, manage or manipulate any (possibly large) number of models. Likewise, although only a single application 310 is shown, it will be clear that embodiments of the invention may model a large number of applications. Specifically, by modeling an application as described herein, embodiments of the invention may model any application based on screens produced by the application and related events. Accordingly, in order to model an application by an embodiment of the invention, information related to a logic or other aspect of the application is not required. In particular, embodiments of the invention may model an application without relaying on information related to logic or other non-visible aspects of the application being modeled.

MSMU 325 may generate, update or otherwise manipulate or manage a model, operations and methods related to generating, modifying or updating models described herein may be performed by MSMU 325. PIU 345 may graphically present a model, e.g., present a sequence of screenshots based on transition information in a model. PIU 345 may receive, e.g., from MSMU 325, any information included in a model and may use such or other information in order to enable a user to interact with a model. For example, PIU 345 may graphically present a model to a user by displaying screens and graphically representing flows or transitions, e.g., PIU 345 may present a model by displaying screens and transitions as shown in FIG. 1. PIU 345 may enable a user to modify a model. For example, based on user input, PIU 345 may remove button 185 from a screenshot representing screen 115 and an updated model in which button 185 is omitted from a representation of screen 115 may be generated and stored.

An updated model may be automatically generated. For example, modeling an early version of an application, model 330 may include representations of screens 110, 115 and 120 and transitions 150 and 155, but may not include any information related to screen 125. When a new version of the application that includes screen 125 is executed, a system may monitor the execution, and may relate the execution to model 330. For example, screenshots and transitions related to an execution of the new version may be captured as described herein and compared, or otherwise examined in relation to, model 330. Upon determining that screen 125 and a transition thereto are not represented in model 330, MSMU 325 may generate model 335 that may include information included in model 330 and additional information to represent screen 125 and related transitions, e.g., as shown by 160 and 175. In other embodiments, an update model may include references to an existing model. For example, rather than storing information related to screen 110, updated model 335 may store a reference to model 330, e.g., a reference to 210. Any combination of information and references may be included in a model.

In another example, based on user input, PIU 345 may remove a screenshot and/or transition from a model. According to user input, PIU 345 may change metadata, transition information and/or screenshots or other parameters in a model. For example, based on user input, PIU 345 may remove a screen or transition from a model to produce an updated model and may further store the updated model (e.g., in storage 340). In yet another example, a model may be updated or augmented based on a placeholder. For example, a representation of screen 115 may be removed by a user from a model and the user may further insert a placeholder (or a blank screen) to replace the representation of screen 115. Subsequently, e.g., when a session involving the relevant application is performed, the session may be tracked or monitored, and, following a click on button 181, a new (previously unknown) screen may be produced by the relevant application. Identifying a transition to a placeholder and provided with a screenshot of the new screen, MSMU 325 may replace the placeholder with a representation of the new screen. Similarly, elements within a screen may be replaced by blanks or placeholders and the placeholders may automatically be replaced by representations of actual elements based on screenshots captured in a subsequent execution of the modeled application.

As described herein, a session may be recorded based on a user session that includes executing an application, interacting with the application and recording screens, interactions and events in a recorded session by referencing data in a model from within a recorded session and/or storing differences or deltas in the recorded session. As further described, differences or deltas may be differences between screens displayed by the application and screens as represented in the model. Other differences may be related to transitions or events.

However, other methods of recording a session or generating a recorded session may be contemplated. For example, a session may be recorded, or a recorded session may be generated, based on a model even without executing, or interacting with, the modeled or relevant application. For example, as described herein, a model may be interactive. Accordingly, using an interactive model, a session or an interaction with the modeled application may be simulated and recorded, e.g., screens may be displayed and transitions may performed based on user interactions with a model (and not with the modeled application).

An interaction with a model may be recorded to produce a recorded session. In other embodiments, screens and events may be included in a recorded session using drag & drop techniques as known in the art. For example, to generate a recorded session, screens in a model may be dragged and dropped into the recorded session. Clearly, when recording a session based on an interaction with a model, or only based on in formation in a model (e.g., with no reference or relation to an execution of the relevant application), no differences are included in the recorded session since all screens, transitions and events in the recorded session are as included, or represented, in the model. Accordingly, a recorded session produced by interacting with a model (or otherwise based only on the model) may generally only include references to the model and no differences or delta information.

Following a generation of a recorded session based on an interaction with a model, e.g., as described above, the relevant application may be executed and interacted with and the recorded session may be updated, e.g., to accommodate or reflect differences between screens produced by the application and screens represented or included in the model (and referenced in the recorded session). For example, when recorded in a session based on a model, text input box 180 in screen 110 may be empty. However, when a session with the application is later held, automated, monitored, tracked and/or recorded, a user may enter a name in text input box 180. In such case, to record the session (or update a recorded session), data representing a difference between an empty text input box 180 (as in the model and in the originally recorded session) and text input box 180 including a user name (as in the later session) may be included in the recorded or updated session. In yet another recorded session where yet another, different user name is used, the difference recorded may reflect that other user name. A difference detected may be reported.

Accordingly, a plurality of sessions may be recorded by referencing a single model and each recorded session may store the relevant, particular difference between the recorded session and the model. Accordingly, a recorded session may be automatically updated in order to represent or reflect a difference between a recorded session and a model. A recorded session may include a difference between the recorded session and another recorded session. For example, a first recorded session may include a screen and a form included in the screen and the form may include or contain text that may be represented as a difference from an empty form as represented in a model. A second recorded session may represent different text or entries in the same form by recording a difference between the (possibly empty) form as represented in the model and the form as included in the second session or the second session may include a difference between the first and second sessions.

A recorded session may be automatically modified any time a difference between the recorded session and a subsequent session is identified, discovered or determined. For example, a user may review a recorded session, modify screens, events or flows in the recorded session and save the updated or revised recorded session. Subsequently, a session with the relevant application may be automated using the updated recorded session, or a session with the application may be tracked or monitored based on the revised recorded session, and differences between the updated recorded session and an actual session may be identified and the updated, revised recorded session may be automatically modified, e.g., in order to reflect the last actual session with the application.

As described herein, a recorded session may be used in order to automate an interaction with an application. For example and as described, based on a recorded session, a screen displayed by an application may be identified, an event or interaction with the application may be determined (e.g., based on the screen and transition information included in a recorded session) an event may be produced or provided (e.g., a click event may be simulated, executed or delivered to a selected GUI element on a display screen) and an expected screen may be determined. For example, based on a model or a recorded session, an embodiment may determine a subsequent screen to be presented by an application following an interaction with a currently displayed screen.

In case a screen displayed by an application is different from an expected screen, an embodiment may perform one or more actions. For example, if a screen displayed is different form a screen expected based on a recorded session, then the recorded session may be modified or updated such that the screen displayed is expected in a subsequent repay of the session. Additionally or alternatively, an error may be reported, e.g., a bug may be reported and the bug report may indicate the screen, the difference between the displayed screen and the expected screen and so on. Accordingly, a recorded session may be automatically modified, revised or updated, e.g., based on an automated interaction with an application.

In a typical case, a session recorded or created based on a model and possibly irrespective of an actual execution of the relevant application may typically be updated at least once, e.g., when such recorded session is used for the first time for an automated interaction with the application. For example, a model based on which a recorded session is generated may include screens as defined by a project manager. However, as implemented by a programmer, and consequently, as produced by the relevant application, screens displayed by the application may differ from screens in a model and, consequently, from screen in a session recoded based on the model. When a recorded session is used in order to replay the session, differences between the screens as included in the model and as actually displayed by the application may be identified (e.g., screens displayed by the application may be compared to those in the model) and the recorded session may be updated to include the differences. A subsequent automated interaction, based on the updated recorded session may require no further updates since the differences may already be represented in the updated recorded session.

It will be understood that an automated modification or update of a recorded session as described herein may be applicable to any recorded session, e.g., a recorded session created or generated based on a model as well as a recorded session that was previously modified by a user. For example, a recorded session may be modified by a user (e.g., text in a form may be removed or changed) and the modified recorded session may be saved. Subsequently, the saved (and modified) recorded session may be used, e.g., in order to automate an interaction with the application. When screens produced by an execution of the application are examined with reference to screenshots in the saved, modified recorded session, a difference may be determined and the recorded session may be automatically modified again. It will be understood that modified recorded sessions may be saved such that a history of modifications is maintained. For example, when modifying a recorded session, the previous recorded session may be saved and a new version of the recorded session (including the last modifications) may be generated and separately saved. Accordingly, similarly to comparing and graphically displaying differences between models as described herein, differences between recorded sessions may be graphically presented.

As shown by 350, a system according to embodiments of the invention may interact with an external application. For example, based on an event, a parameter stored in a model may be provided to an external system that may perform an action and/or return data based on a provided parameter. An event may be related to an execution or test of an application. For example, model 330 may be generated for application 310 and may include representations of some or all screens and transitions of application 310. Subsequently, application 310 may be executed or tested (e.g., following a release of a new version). Testing of application 310 may include capturing screens produced by the tested application 310 and relating them to model 330.

For example, application 310 may produce the screens and transitions shown in FIG. 1. Accordingly, information in representation 210 may indicate that a transition from screen 110 to 115 is possible but a transition from screen 110 to screen 125 is not possible. However, (e.g., due to a bug in its code), application 310 may display screen 110 and, following a click on button 181, display screen 125. An embodiment may capture screen 110 when displayed during the test run and identify its representation in model 330 (e.g., as shown by 210). Next, the click and screen 125 may be captured. However, based on representation 210, an embodiment may determine the transition from screen 110 to screen 125 is an illegal, inconsistent or an invalid transition (e.g., a bug as known in the art). An illegal or invalid transition may be an event that may be acted upon. For example, information included in 210 may include a reference to a bug tracking system and a condition (or event) such as an invalid transition. Accordingly, upon detecting or determining an invalid or illegal transition, a system may automatically interact with an external system, report the invalid transition and provide additional information, e.g., identification parameters of the relevant screens etc. Any other criteria, event or condition may be defined as an event that may be associated with an action. Accordingly, based on a model, a system according to embodiments of the invention may identify, in real-time, an event related to an execution of an application and may further perform one or more actions related to the event.

In some embodiment, an action may include enabling a user to modify or update a model, e.g., presenting a user with a graphical interface designed to enable a user to modify a model. For example, in the above example, rather than (or in addition to) reporting a bug, a system may enable a user to modify or update model 330 such that, according to an updated model, a transition from screen 110 to screen 125 is an acceptable, valid or legal transition. In other embodiments, e.g., based on a configuration parameter of MSMU 325, an updated model may be automatically generated, e.g., as described herein. In yet other embodiments, an external system may interact with a tested system. For example, upon detecting an event, MSMU 325 may interact with external system 350, e.g., may provide external system 350 with data and parameters as described herein, including a reference to application 310 (e.g., a process id as known in the art). External application 350 may then interact with application 310, e.g., terminate application 310.

It will be noted that the system shown in FIG. 3 is an exemplary system and that other systems or configurations may be contemplated without departing from the scope of the invention. For example, in an embodiment, CU 320, MSMU 325 and/or PIU 345 may be combined into a single unit or module. In other exemplary embodiments, MSMU 325 may be divided into a number of units, e.g., a screen matching unit, a screen update unit etc. In yet other configurations, external system 350 may interact with the system via PIU 345 and not directly with MSMU 325 as shown.

According to embodiments of the invention, a model may be displayable. For example, screenshots and flows included in a model may be displayed or graphically provided. As described herein, a screenshot included in a model may represent any graphical and/or displayable aspect of a screen. Accordingly, a screenshot may be used in order to reproduce an appearance of a screen, thus, a model may be used to graphically display screenshots. For example, PIU 345 may display screenshots included in model 330.

Displaying a model may include displaying or reproducing a flow. For example, PIU 345 may display transitions as shown by arrows 150, 155, 160. For example, following a rendering of one of screenshots 250 of screen 110, PIU 345 (or management unit 325) may examine transition information 251 and/or metadata 252 and identify a transition to screen 115, as shown by 270. Accordingly, based on at least transition information 251, at least one of screenshots 260 may be displayed subsequent to a display of the one of screenshots 250. Based on information in transition information 251 and/or metadata 252, a click on button 181 may be graphically indicated, shown or simulated as part of presenting or reproducing a flow.

For example, model 330 may include representations of screens 110 and 115 as respectively shown by 210 and 215, a similar representation of screen 120, representations of button 181 and 184 in metadata 252 and 262 respectively, and an association of a click on button 181 with a transition to screen 115 in transition information 251. In such case, model 330 may be used in order to display or graphically reproduce the session. For example, PIU 345 may extract model 330 from storage 340, render at least one of screenshots 250 on a display screen and, based on information in transition information 251 and metadata 252, graphically simulate or display a click on a representation of button 181 in the displayed screenshot. Next, based on transition information 251, PIU 345 may determine that one of screenshots 260 (representing screen 115) is to be displayed following a click on button 181 and may, accordingly, present the relevant screenshot. In a similar way, subsequent screenshots and events included in a session recorded as described herein may be presented.

Models may be compared or otherwise related. A difference between models may be graphically displayed. For example, a first version of application 310 that produces screens and flows shown in FIG. 1 may be modeled and modeling information may be stored in model 330. However, in this first version, screen 115 may not yet include button 185 ("SKIP EDIT"). For example, button 185 may be added in a subsequent, second version of application 310. The second or subsequent version of application 310 may be modeled and modeling information may be stored in model 335. At any later stage, PIU 345 may use models 330 and 335 in order to graphically display differences between the first and second versions of application 310. For example, PIU 345 may compare screenshots in models 330 and 335, identify differences and graphically display the differences. For example, button 181 included in the first version of application 310 but not in the second version may be highlighted. Other views provided may include a high level view of differences between models, e.g., areas where most of the differences exist, number of mismatching screens etc. It will be understood that since, as described herein, any difference or inconsistency between models may be determined, any view, statistics or other information may be generated and provided.

Embodiments of the invention may record a session. Recording a session may be done by referencing data included in a model. Conceptually, a model as described herein may be a recording of a session. As described herein, by including information such as, but not limited to, screenshots, events and transitions, a model may include any information required in order to graphically reproduce a session. A model as described herein, used for recording a session, may be used in order to monitor a real-time session and determine various attributes of the session, e.g., whether or not a real-time or other session includes screens or transitions not included in the recorded session.

Preferably, a session may be recorded by referencing a model or a number of models. For example, a session recorded as shown by session 355 in FIG. 3 may include references to model 330. A plurality of sessions may reference a single model, for example, sessions 355 and 360 may each include references to model 335. A recorded session may include references to a plurality of models, for example, recorded session 355 may include references to screenshots, metadata or transition information in both models 330 and 335.

For example, model 330 may include information describing, or related to, screens and transitions shown in FIG. 1. In such exemplary case, in order to record a session (e.g., as shown by session 355) that includes screens 110, 115 and 125 (according to transitions 150 and 170), session 355 may include references to information representing screens 110, 115 and 125 and flows 150 and 170 in model 330. For example, rather than storing a screenshot of screen 110 in recorded session 355, a reference to 210 may be stored in recorded session 355. Accordingly, any number of sessions may be recorded by referencing a single model. For example, by referencing screenshots and associated transition information and metadata in model 330, any flow including any one of the screens and transitions shown in FIG. 1 may be recorded.

According to embodiments of the invention, a method of recording a session may include capturing, receiving or otherwise obtaining a set of screenshots and events related to a session, comparing, matching or otherwise relating a received or captured screenshot or event with a screenshot or event included or represented in a model, determining a difference between the received or captured screenshot or event and the matched screenshot or event, and recording the session by recording the difference. Recording a session may include recording or storing a reference or identifier. For example, recording a session may include storing a reference to a screenshot, metadata and/or transition information in an existing model. In some embodiments, recording a session may include generating and storing any information, e.g., information included in a model as described herein.

To record events in a session, events captured may be compared or otherwise related to events in a model and references to matching events in a model may be used in order to record a session. Differences between captured events and events represented in a model may be used in order to record a session. Accordingly, recording a session may include recording a deviation, a difference, a change (or a delta as known in the art) determined by examining captured screens, events, transitions and flows and respective screens, events, transitions and flows included or represented in a model.

For example, when generated, model 330 may be related to an application that produces the screens shown in FIG. 1 and may include representations of the screens and transitions shown in FIG. 1 and related events (e.g., clicks on buttons) as described herein. When subsequently recording a session involving the application, CU 320 may capture a screenshot of screens produced by the application (and related events) and MSMU 325 may examine captured data based on model 330. For example, in a recorded session, MSMU 325 may determine that the user name entered in text input box 180 is different from the user name recorded in the model. MSMU 325 may determine a difference to be the user name in the session and may further record a reference to screen 110 (e.g., a reference to 210) in model 330 and information representing the difference between the captured screenshot and a screenshot in model 330. In order to reproduce the session based on the recording, the original screenshot may be obtained from model 330 and the difference may then be applied. For example, a screenshot of screen 110 may be obtained from model 330 and the user name in text input box 180 may be changed based on information in the recorded session. It will be understood that a recorded session may include references to an existing model as described herein as well as any other information. For example, screens and transitions in a model may be referenced in a recorded session and, possibly other screens or transitions (e.g., ones not included in a model) may be included in the session, e.g., as described herein with respect to a model.

It will be understood that recording a session may be an iterative process comprising receiving screenshots related to a session, matching the received screenshots with screenshots included in a model, determining differences between the received screenshots and the respective, matched screenshots, and recording the session by recording the differences, identifiers or references to the model, and possibly additional information, e.g., transition information or metadata. Similarly, recording a session may include capturing events, matching captured events with data in a model (e.g., metadata or transition information), determining a difference, deviation or change based on the captured events and data in the model and storing information related to the difference, deviation or change.

As described herein, any number of sessions may be recorded by referencing data in a single model. As described herein, a session may be recorded by referencing data in a plurality of models. A session may be related to any number of applications. For example, a session may include generating a document using a first application and sending the document using a second application. In recording a session that involves two or more applications, two or more models may be referenced in the recorded session. A recorded session may include references, differences, identifiers or other information as described herein that may be related to a number of models. A number of models referenced or otherwise associated with a recorded session may be related to a number of (possibly different or unrelated) applications. For example, to record a generation of a document, a model of a word processing application may be referenced such that screens related to editing a document may be recorded by referencing screenshots and events in the model of the word processing application. Similarly, to record sending the document, references to a model of an electronic mail application may be used. Accordingly, by including references to models related to a number of applications in a single recorded session, a session involving any number of applications may be recorded.

A method according to embodiments of the invention may include graphically displaying a difference between a first and a second recorded session. For example, based on relating a respective first and second session recordings, a difference between the sessions may be presented. For example, a difference between a first and second screenshots included in a respective first and second recorded sessions may be presented, e.g., in overlay or by presenting screenshots side by side. A difference in flows may be graphically or otherwise presented. For example, based on information included in transition information in two different recorded sessions, differences between flows may be graphically shown. For example, flows common to a first and second sessions may be displayed using curves or arrows having a first color and flows or transitions included in a first session and missing in a second session may be identified and displayed by curves or arrows in a specific color that may be a different from the first color.

A method according to embodiments of the invention may include graphically displaying a difference between a first model and a second model. For example, differences between screenshots and flows may be identified, indicated and displayed. Screenshots and flows common to, or included in, compared models may be indicated and displayed. Presenting a difference between sessions or models may include displaying information derived based on the compared sessions or models. For example, comparative statistical information related to the most popular screens or flows may be displayed, e.g., as pie charts or other graphical elements.

As described herein, a model of an application may be generated based on an execution of the application. A session involving an application may be recorded based on screens, events and other information related to an interaction with the application. Other than screens and events and other information obtained and recorded as described herein, various other information, parameters or data may be obtained and/or calculated. For example, when tracking an execution of an application, any relevant information may be obtained, stored or recorded in a model, recorded session or elsewhere. For example, a user name, a date and time, a duration, screens presented or any other data related to an execution of an application may be recorded or stored.

For example, when recording a session, a user name may be extracted (e.g., from text input box 180 in a screenshot) and stored in association with the recorded session. Other information, data or parameters collected and stored in association with a session or model may be a duration of a session, time required for a transition from a first to a second screen (e.g., as affected by available processing power), the number of invalid, or unexpected transitions encountered, any dynamic data or parameters entered (e.g., user name, password and the like), selections (e.g., in menus) etc. It will be noted that information obtained with respect to a session or model may be related to a $3^{rd}$ party system or application. For example, a recorded session related to an application may include information provided to the application by an external application, e.g., a database. As described herein, storing information related to a session may be accomplished by storing a difference from a model or from another recording of another session. From example, recording a user name may be accomplished by storing a difference of the current user name from a previous user name.

Operations and data related to a model or recorded session may be recorded. For example, an identification of the user who recorded, modified or executed a model or session may be recorded, the number of changes that were made to a sessions or model, their dates and other parameters may all be recorded and may provided or presented at a later time.

Information collected may be processed, and processed data may be stored. Processed information may be related to a single session or it may be related to a number of sessions. For example, average session time may be calculated for a number of sessions. Average transition times may be calculated for a session or a plurality of sessions. Any other data may be generated and displayed, for example, related screens in two or more sessions or models may be compared and a comparison may be graphically presented etc. Accordingly, by recording any relevant information in a model or recorded session, embodiments of the invention may provide any relevant information with respect to an execution of an application. For example, any deviation from a previously recorded execution of an application (e.g., related to screens, event, time or duration and the like) exhibited by a subsequent execution of an application may be identified, recorded and/or reported.

Comparing sessions may be done in real-time. For example, CU 320 may capture, in real-time, events and screenshots of a session. For example, screens 315 may be produced by application 310 during a session including a user interacting with application 310. MSMU 325 may, in real-time, determine a difference between screenshots and events provided by CU 320 and screenshots and events in a recorded session. For example, capturing screenshots and determining differences may be performed in real-time as described herein, e.g., by comparing screenshots, metadata and transition information obtained in real-time with screenshots, metadata and transition information in a model or recorded session.

Embodiments of the invention may determine whether a session is compatible with a model or with another recorded session. For example, by relating or comparing screenshots, flows or transitions in a session to a recorded session, MSMU 325 may determine that a specific transition as included in a session is incompatible with a recorded session, e.g., such specific transition is not represented in the recorded session. For example, a session may be recorded in relation to an execution of a first version of an application. Following an update of the application, an updated model may be generated. The recorded session may then be related or compared to the updated model in order to determine whether it is compatible with the updated model. For example, a recorded session may be determined to be compatible with an updated model if all screens and flows in the session are represented or possible according to the updated model. An embodiment may verify or determine compatibility of a set of recordings with a model and may provide a list of all recorded sessions in the set which are compatible with the model or with an updated model. In another example, a list of all sessions in a set which are incompatible with a model may be presented or recorded. In yet another example, by determining differences between a model (e.g., of a new version of an application) and a set of recorded sessions, a list of all affected recorded sessions may be provided and/or stored. For example, all recorded sessions which are incompatible with a new version of an application may be generated based on the recorded session and a model of the new version.

In an embodiment, a recorded session determined to be incompatible with a model may be updated. For example, by recording differences between a recorded session and a model in an updated session, a compatible, updated session may be generated and may be used, e.g., for testing an application as described herein. In another embodiment or scenario, a user may manually correct or modify a session. For example, a user may remove or modify a representation of a screen from or in a session or a user may modify a transition in a session. Modifications made by a user may be marked. A modified or an incomplete session may be automatically updated or modified. For example, a recorded session may be examined in relation to a subsequent execution of the application and may further be modified based on the subsequent execution. For example, one or more screenshots in a recorded session (or in a model) may be updated or even replaced based on screens displayed by an execution of the application. For example, a user may review screens included in a model or recorded session, determine that a specific screen is to be updated and further remove the screen from the model or mark the screen as requiring an update. Subsequently, an execution of the relevant application may be monitored or tracked, e.g., screens produced by the application or transitions between screens may be examined with respect to the model or recoded session.

When identifying a new screen produced by the application that is not represented in the model, an embodiment may automatically add a representation of the new screen to the model. Likewise, when identifying a new screen displayed by the application that matches a representation of a screen in the model but is further different from the representation, an embodiment may automatically update the representation in the model according to the new screen. Similarly, transitions may be added or updated. Updating screens, transitions or other elements in a model or recorded session may be based on elements being marked. For example, a representation of a screen may be updated if the representation was previously marked by a user as needing an update.

At any point, e.g., when relating a received screenshot to screenshots in a model or recorded session, MSMU 325 may generate an event or perform an action. For example, upon determining, based on relating a received screenshot to a model or recorded session, that an invalid transition from a first screen to a second screen occurred, MSMU 325 may generate an event or perform an action. For example, an invalid transition may be a transition not included or represented in the relevant model. An action may include updating a model (or generating an updated model), e.g., by adding a screenshot, metadata or transition information to a model or by modifying data in a model. An action may include interacting with an external system or application as further described herein.

For example, based on a configuration parameter, upon detecting a transition in a session is not included or represented in a reference model or a recorded session, MSMU 325 may send an electronic mail (email) to a predefined recipient list where the email may include screenshots, metadata and/or transition information. Other indications, e.g., a popup window on a display screen or sound may be generated.

According to embodiments of the invention, a system or method may associate a screen produced by an application with a screenshot included in the model, identify or determine an event related to the screen and, determine a subsequent screen expected to be produced by the application based on the event and based on transition information included in the model. For example, following a matching of screen 110 with one of screenshots 250, and using information and/or references as described herein, MSMU 325 may examine transition information 251 and metadata 252 and determine that screen 115 is to be presented next by application 310 in response to a click on button 181. As described herein, references to button 181 and to a click event, as well as to one or more of screenshots 260 may be included in representation 210.

Accordingly, MSMU 325 may determine a subsequent or expected screen based on information in a model or recorded session as described herein. In cases where a number of possible screens may be produced or may be expected, a number of expected or possible screens may be presented. For example, based on transition information associated with at least one screenshot included in screenshots 260, MSMU 325 may determine that either screen 120 or screen 125 may follow screen 115 (as shown by arrows 155 and 170 respectively). Accordingly, provided with a screenshot of screen 115, MSMU 325 may identify related or expected screens and their representation, e.g., screenshots or other information related to both screens 120 and 125 in the above example. An expected screen may be determined based on information related to an event. For example, provided with an event related to a current screen, the set of expected screens may be determined, revised or reduced. For example, provided with a click event related to button 184, and based on transition information as described herein, MSMU 325 may determine that screen 120 is expected next and that screen 125 is not expected to be produced. Predicting a subsequent screen may be performed in real-time or with respect to a recorded session.

By determining an expected screen based on a displayed screen, an embodiment may determine or detect an incompatibility of an application with a model. For example, if, based on a model, screen 115 is expected following a click on button 181 in screen 110, then a display of screen 125 following a click on button 181 may be identified as an incompatibility with the model. Detecting an incompatibility may cause an embodiment to alert a user, record a bug etc. As described herein, detecting an incompatibility may cause an embodiment to update a model or otherwise generated an updated model or an updated recorded session. An incompatibility may be determined based on a recorded session.

For example, if, according to a session, a transition from screen 115 to screen 125 is expected (e.g., this was the sequence recorded in the session) then a transition from screen 115 to screen 120 may be identified as an incompatibility or inconsistency with the recorded session. For example, a session replay may be halted upon detecting an inconsistency of a session with a recorded session.

By determining an expected screen, speed of operation may be served. For example, to automatically replay a session, an embodiment may identify a screen displayed by an application by relating a screenshot of the screen to screenshots included in a recorded session, determine an interaction to be performed (e.g., a click or a selection in a menu) based on data in the recorded session and further determine the next screen to be presented following the event (e.g., transition information described herein). Accordingly, an embodiment may determine, in advance, a screen to be displayed. Consequently, since an expected screen is known, determining that a displayed screen is indeed the expected screen may be achieved quickly, in real-time, by comparing a displayed screen to the expected screen. Moreover, an embodiment may determine a set of expected screens. For example, in case a number of screens may be displayed following a display of a first screen (e.g., both screens 120 and 125 may be displayed following a display of screen 115 as shown by FIG. 1), all possible or expected screens may be identified, e.g., based on transition information associated with the displayed screen. For example, transition information 261 may include references to representations of both screens 120 and 125, accordingly, determining a screen 115 is being displayed by an application, an embodiment may identify screens 120 and 125 as expected screens.

As described herein, a session may be replayed based on a recorded session. Replaying of a session may be according to expected screens. For example, upon identifying a screen being displayed by an application, an interaction with the screen may be performed (e.g., a selection in a menu may be simulated) and an expected screen may be determined based on transition information or other data as described herein. An embodiment may then wait for the expected screen to be displayed. For example, following an automated interaction with a first screen, an embodiment may wait for the next, expected screen to be displayed. For example, following an identification of screen 110 being displayed and based on a recorded session, a click on button 181 may be automatically performed. Based on the recorded session, screen 115 may be determined to be the next or expected screen. Accordingly, a replay of the session may be halted until screen 115 is displayed by the application. For example, CU 320 may continuously capture screenshots of a screen and a replay of the session may only continue after MSMU 325 determines, based on screenshots provided by CU 320, that screen 115 is presented. Upon determining that the next or expected screen (e.g., screen 115 in the above example) is displayed, the next step in the session may be performed (e.g., a click on button 184). The next expected screen may subsequently be determined and so on. Accordingly, embodiments of the invention may replay a session according to screens, interactions and events regardless of timing or other considerations.

A list or set of screens identified or determined as expected screens may be prioritized. For example, based on a metadata indicating the number of times screens have been displayed in previous sessions (e.g., a popularity of a screen), based on information obtained from the application producing the screens or based on a value manually associated with screens by a user, expected screens may be sorted or associated with a ranking or confidence value. Various operations may be performed based on a sorting of expected screens. For example, in updating a model or recorded session, the screen at the top of a sorted list may be selected. In another case, a sorted list may be presented to a user who may select, from the sorted list, a screen to be included in a model or recorded session, e.g., in order to update a model.

Information in a model or session may be used in order to track or replay a session. A recorded session may be used in order to automate a replay of a session. For example, events in a recorded session may be used in order to interact with an execution of the application such that a user interacting with the application may be simulated. For example, a screen produced by the application may be identified in a recorded session by relating a screenshot of the screen with screenshots included the recorded session, an event associated with the screen (e.g., a click on a button) as recorded in the recorded session may be determined and executed. For example, a click on a button in a screen produced by the application may be automatically performed based on an event in a recoded session. An expected screen may be determined based on the recorded session (e.g., based on transition information as described herein). In another embodiment or usage, a session may be tracked or monitored. For example, screens and events included in a session may be captured and related to a model or recorded session.

For example, MSMU 325 or PIU 345 may use information in a model or recorded session in order to interact with application 310. In another embodiment, a separate session replay (or playback) unit (not shown in FIG. 3) may be used. For example, a playback unit may interact with PIU 345 or MSMU 325 in order to obtain access to any information in a model or recorded session. For example, PIU 345 or MSMU 325 may provide services to a playback unit, e.g., identify screens, determine events and the like. In yet another embodiment, a playback unit may be provided with screenshots (e.g., by CU 320), may directly access models or recorded sessions (e.g., in storage), and may perform any relevant operation, e.g., any operation described herein with respect to PIU 345 or MSMU 325. A playback unit may further interact with an application, for example, a playback unit may simulate an action such as a click on a button in a screen displayed by an application or selecting an item in a menu.

For example, application 310 may be executed and may present screen 110. Provided with a screenshot of screen 110, a playback unit may identify button 181 in screen 110 based on data in a recorded session, may examine references to transition or other information (e.g., 251 and 252 in (or referenced by) a recorded session) and may determine that button 181 is to be clicked. Accordingly, a playback unit may simulate a click on button 181 in screen 110 thus automatically interacting with application 310 to replay a session. Similarly, subsequent screens may be identified and interacted with such that a recorded session is repeated by interacting with the relevant application. An automatic replay of a session may include identifying events and deviations from a recorded session as well as performing related actions, e.g., generating an alert when a criterion is met. Accordingly, automatic debugging of application 310, including running sessions and reporting results may be automated, e.g., performed by a system according to embodiments of the invention.

For example, based on a recorded session (that may include a reference to a representation as shown by 210 or other data, e.g., transition information as described herein) and provided with a screenshot of a screen produced by an application, an embodiment may determine a screen that is expected to be produced next. If the expected screen is not provided, e.g., a different screen is displayed, a violation may be determined and an action (e.g., reporting and/or recording a bug) may be performed. An embodiment may wait for a screen determined as expected and, upon the expected screen being displayed, an interaction or event (e.g., a click on a button) may be performed based on transition information or metadata in a recorded session. Accordingly, an automated testing of an application may be performed and may be unaffected by conditions such as computing resources, speed of operation of a computing device etc. For example, an automated testing according to embodiments of the invention may be unaffected by timing considerations and may interact with an application based on screens presented by the application when they are presented.

Embodiments of the invention may enable modifying a recorded session or model, e.g., by a user. For example, PIU 345 may present a graphical view of at least a portion of a session. For example, screenshots and flows may be graphically presented by PIU 345 using images and arrows (e.g., as shown by FIG. 1). A user may interact with PIU 345 and may remove screenshots or flows from a session or model. For example, the transition from screen 125 back to screen 120 as shown by arrow 165 may be deleted from a session or model (e.g., in case the button labeled "BACK TO EDIT" is removed from screen 125). Likewise, a screenshot may be replaced by a user, e.g., a screenshot including the button labeled "BACK TO EDIT" may be replaced with a screenshot that does not include this button. In another case, a screenshot (or portion thereof) including sensitive or inappropriate information may be replaced.

As discussed, statistical information may be collected or derived based on a model or recorded session. For example, MSMU 325 may receive data related to a plurality of interactions with the application 310, may relate the data to a model to produce summary information and may graphically present the summary information. For example, each time MSMU 325 receives a screenshot of screen 110 it may increment a counter in metadata 252. Accordingly, a graphical presentation may be provided showing the number of times a screen is presented. Summary information may be specific to a session (e.g., the number of times screen 110 was displayed in a session) or it may be global (e.g., a cumulative counter).

Pie chart graphs may provide a percentage view or other aspects related to screens and events. Counters may be maintained for events (e.g., the number of time a button was clicked) flows and transition information in a model. Generally, any interaction with an application may be analyzed based on information in a model and an analysis result may be stored in the model and further used in order to present information related to interactions with the application.

A heat map may be generated for a model or a session. For example, based on counters included in metadata as described herein, statistical data reflecting the relative rate of presentation of screens may be graphically displayed. Similar data related to events or flows may be collected and presented. For example, an embodiment may present a set of thumbnails of screenshots and further highlight screenshots associated with screens presented more often than other screens such that areas (or screens) of the related application which are visited more than other areas or screens may be easily identified. Other aspects, e.g., time spent in screens may be similarly graphically displayed based on relevant data collected and included in metadata. For example, the time spent in each screen of an application may be determined. For example, time from presentation of a screen to transition to a subsequent screen may be recorded in metadata associated with the screen. In other embodiments, a coverage indicator for a session may be generated and graphically or otherwise provided. For example, a coverage indicator may enable a user to quickly identify areas or screens that were mostly interacted with in a session as well as identifying or see which screens were only visited a few times or not at all.

Based on a model or a recorded session as described herein, an embodiment may monitor or track an execution of an application. For example, screens produced during a session, related events and other information may be captured and examined with relation to a model or recorded session as described herein and any information, data or parameters may be determined or calculated and recorded. For example, the number of times a specific screen was displayed by an application may be determined and recorded by identifying the screen (e.g., based on its representation in a model) and incrementing a counter. Similarly, unexpected transitions, incompatibility with a recorded session or other events may be determined and recorded.

By correlating data in an external system with data in a model or recorded session, various views may be enabled and provided. For example, an identification of a representation of a screen in a model may be provided to a bug tracking system. When recording a new bug in the bug tracking system, the identification of the screen (e.g., an identifier of, or a reference to, representation 210) may be entered to the bug tracking system in association with the new bug. Accordingly, bugs in the bug tracking system may be related or correlated with screens represented in the model. Accordingly, a graphical representation of bugs may be provided by overlaying information in the bug tracking system on graphical or other data in a model or recorded session. For example, number, severity or other aspects of bugs as maintained by the bug tracking system may be overlaid on a graphical presentation of screens such that bug related information is overlaid on images of the screens.

For example, by combining information in a model with information in a bug tracking system, a graphical presentation of bug related information may be displayed, for example, by graphically displaying screens and further highlighting screens based on the number or severity of related bugs, e.g., screens associated with more than 20 bugs may be displayed with a red border. In another example, all screens for which bugs were found may be displayed and a heat map representing the number or severity of bugs may be overlaid on the displayed screens. In yet another example, screens may be displayed with a size that is proportional to the number of bugs, e.g., as presented, a screen with which seven bugs are associated may be larger than a screen with which only three bugs are associated. In other embodiments, a density of bugs in an application may be graphically overlaid on a presentation of the application's screen.

In an embodiment, PIU 345 may provide APIs that may enable an external system to display heat-maps based on statistical or other data provided by the external system. Accordingly, it will be understood that although a bug tracking system is mainly described herein, information from any $3^{rd}$ party application or source may be correlated with information in a model as described herein and that graphical or other representations of information included in a model and an external application may be combined and presented.

Information related to an execution of an application may be collected and/or provided to an external system, e.g., in real-time. For example, a bug tracking system and a system according to embodiments of the invention may share identifications of screens and, accordingly, density of bugs per screens may be presented. For example, upon detecting an invalid transition, a counter may be updated in metadata associated with a relevant screen or transition. In another embodiment, a reference to the relevant screen may be provided to an external bug tacking system. Accordingly, test results or other related information may be provided by a system to an external system. Provided with an identification or reference to screens or transitions determined to violate a condition as described herein, an external system (e.g., a bug tracking system) may produce statistical or other information. For example, each time an inconsistency related to a screen is identified as described herein (e.g., an invalid transition from/to the screen or a wrong item appearing in the screen are identified based on a model or recorded session) a bug tracking system may be provided with an identification parameter identifying the screen and possibly additional information. Accordingly, by collecting all references to the screen in the bug tracking system, various statistical or other information may be determined and displayed.

According to embodiments of the invention, a model may be interactive. A method of providing an interactive model may include displaying a first screenshot included in the model, capturing an event related to an interaction with the displayed screenshot, and, based on the event, metadata and transition information in the model, selecting to present a second screenshot.

For example, a screenshot included in a model may be displayed on a display screen. Based on metadata associated with the screenshot, items or objects (e.g., buttons, menus etc.) may be identified in the screenshot and may possibly be marked or highlighted. A click or other interaction with an identified item in the screenshot may be captured and, based on metadata associated with the item and transition information, a transition to a subsequent screen may be simulated or performed. Accordingly, using a model, an interaction with a modeled application may be simulated in a transparent manner. Accordingly, a user may be unable to tell a difference between an interaction with an application and an interaction with an interactive model of the application.

According to embodiments of the invention, a method may include storing, in association with a screenshot, a parameter and/or condition, detecting a transition from the first screen to the second screen, wherein at least one of the screens is related to the screenshot, and providing the stored parameter to an external system, wherein the external system is configured to perform an action based on the provided parameter. For example, a model or a recorded session may include criteria or a definition of a condition that may be associated with a screen or transition. For example, an invalid transition or a mismatch of a screenshot. The criteria or condition may further be associated with an action and additional parameters. When screenshots and other information are obtained, e.g., in real-time, during an execution of a tested application, they may be related to the model as described herein and, if a condition or criteria are met or violated, the associated action may be performed. In another example, by monitoring in real-time screens produced by an application, an embodiment may determine, based on information in a model or recorded session, that an unauthorized user interacts with an application. Such condition may be associated with an action that may be informing a security officer of a security breach. For example, the list of authorized users may be included in metadata associated with a login screen, accordingly, an attempt to login to an application may be detected and reported.

For example, metadata associated with a screenshot may include executable code or a reference to an external application. Metadata associated with a screenshot may include input parameters for an included executable code or for a referenced external application. Metadata may include a value, parameter, criteria or condition related to an execution of the included executable code or referenced external application. For example, external application 350 may be a database and a parameter stored in metadata 252 (e.g., by MSMU 325) may be a database key that may be used to retrieve an email recipient list from the database. A condition in metadata 252 may be, for example, the number of times screen 110 has been presented. For example, based on a counter described herein, if a specific screen is presented more than a predefined number of times during a single session, then a criterion in metadata 252 may be met and a key in metadata 252 may be used to retrieve an email recipient list from a database and an email may be sent to the recipient list. Executable code, script and the like included in metadata 252 may be executed by MSMU 325 and may cause MSMU 325 to perform predefined tasks when predefined conditions are met. For example, upon a specific event or condition, MSMU 325 may generate an alert, store a snapshot etc.

Embodiments of the invention may synchronize or correlate an operation or execution of two or more applications. For example, an execution of a first application may be monitored by capturing screens and events related to the first application and conditions, rules or criteria may be checked based on captured screens and events, e.g., as described herein. An action associated with an event, rule or criteria may be included in a model or recorded session as described herein. The action may include interacting with a second application. For example, an action may include providing a second application with any information, for example, information generated by the first application. The second application may perform an action based on provided information. Accordingly, an operation or execution of the first and second applications may be coordinated, correlated, synchronized or otherwise related. For example, an operation of a bug tracking system may be affected by a report of an inconsistency of screens or flows as described herein. In another example, by monitoring or tracking an operation of an application (e.g., comparing screens produced by an execution of the application with screenshots and other information in a recorded session or in a model), a security application may be interacted with and may be caused to operate based on provided information, e.g., terminate the application if an unauthorized person attempts to interact with the application. A number of applications may be interacted with based on a single event or screenshot or based on a plurality of screenshots or events. Accordingly, by monitoring an application based on screens and events as described herein, embodiments of the invention may supervise an operation or execution of an application and/or coordinate an operation of one or more applications.

Figure 4:
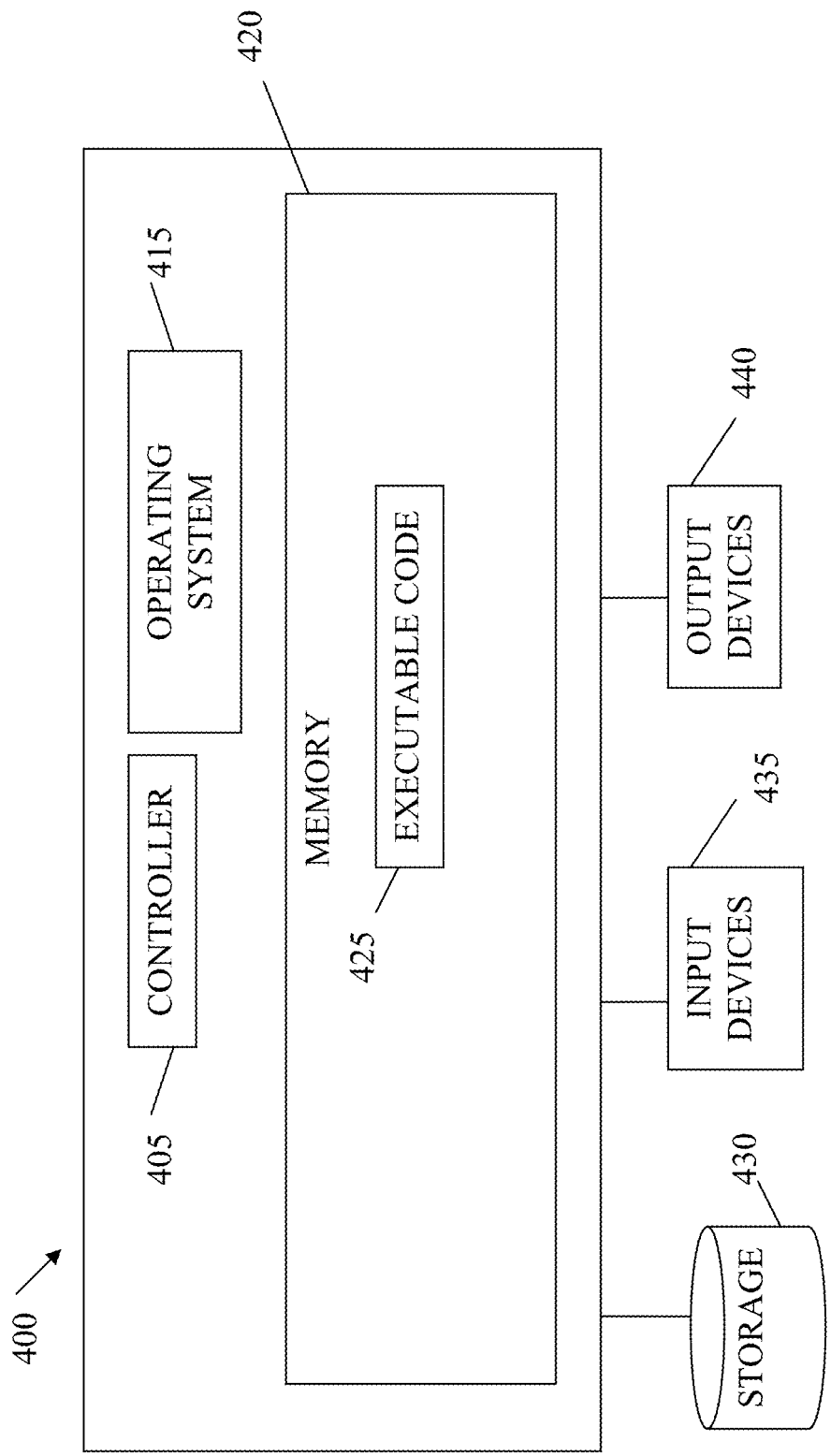
FIG. 4 shows high level block diagram of an exemplary computing device according to embodiments of the present invention.

Reference is made to FIG. 4, showing high level block diagram of an exemplary computing device according to embodiments of the present invention. Computing device 400 may include a controller 405 that may be, for example, a central processing unit processor (CPU), a chip or any suitable computing or computational device, an operating system 415, a memory 420, a storage 430, input devices 435 and output devices 440.

Operating system 415 may be or may include any code segment designed and/or configured to perform tasks involving coordination, scheduling, arbitration, supervising, controlling or otherwise managing operation of computing device 400, for example, scheduling execution of programs. Operating system 415 may be a commercial operating system. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different memory units.

Executable code 425 may be any executable code, e.g., an application, a program, a process, task or script. Executable code 425 may be executed by controller 405 possibly under control of operating system 415. For example, executable code 425 may be an application configured to perform operations described herein with respect to CU 320, MSMU 325 and/or PIU 345. Where applicable, executable code 425 may carry out operations described herein in real-time. Computing device 400 and executable code 425 may be configured to update, process and/or act upon information at the same rate the information, or a relevant event, are received. In some embodiments, more than one computing device 400 may be used. For example, a plurality of computing devices that include components similar to those included in computing device 400 may be connected to a network and used as a system. For example, generating and maintaining a model as described herein, or verifying a session may be performed in real-time by executable code 425 when executed on one or more computing devices such computing device 400.

Storage 430 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 430 and may be loaded from storage 430 into memory 420 where it may be processed by controller 405. In some embodiments, some of the components shown in FIG. 1 may be omitted. For example, memory 420 may be a non-volatile memory having the storage capacity of storage 430. Accordingly, although shown as a separate component, storage 430 may be embedded or included in memory 420.

Input devices 435 may be or may include a mouse, a keyboard, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400 as shown by blocks 435 and 440. For example, a wired or wireless network interface card (NIC), a modem, printer or facsimile machine, a universal serial bus (USB) device or external hard drive may be included in input devices 435 and/or output devices 440.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 420, computer-executable instructions such as executable code 425 and a controller such as controller 405.

Methods and operations described herein may be performed by a system or by a computing device. For example, a system including components shown in FIG. 4 or a computing device similar to computing device 400 shown in FIG. 4 may generate and use a model as described herein. It will be understood that embodiments described herein may be performed by a dedicated or other hardware component or device that may include hardware, software or firmware or any combination thereof.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. A system as described herein may include one or more devices such as computing device 400 and/or may include one or more components shown in FIG. 4.

Unless explicitly stated, the method embodiments described herein are not constrained to a particular order or sequence. Additionally, some of the described method embodiments or elements thereof can occur or be performed at the same point in time. Where applicable, the described method embodiments may be carried out or performed in real-time. A system including one or more components shown in FIG. 4 may process data and events at the rate data and events are received by the system. For example, computing device 400 may generate, maintain and use a model at the same rate screenshots and events are captured, thus providing real-time model generation, maintenance and usage.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of automatically updating a displayable model, the method comprising:
   a. capturing, by a controller, a first screenshot of a first screen produced by an application when the application is executed;
   b. capturing, by the controller, a second screenshot of a second screen produced by the application when the application is executed, wherein each of the first and second screenshots includes a set of pixel values respectively representing the first and second screens;
   c. if at least one of the first and second screens is not represented, by a screenshot, in the displayable model then storing, by the controller, in the displayable model at least one of the first and second screenshots and transition information related to a transition from the first screen to the second screen such that the displayable model includes the first and the second screenshots;
   d. if the first and second screens are represented in the displayable model then capturing, by the controller, an additional screenshot of a screen produced by the application when the application is executed and repeating operations b and c; and
   e. using the model, by the controller, to graphically display a flow from the first screen to the second screen.

2. The method of claim 1, wherein the displayable model is an interactive model and wherein the method comprises simulating, based on model, an operation of the application by:
   displaying a first screenshot included in the model;
   capturing an event related to an interaction with the displayed screenshot; and
   based on the event and transition information in the model, selecting to present a second screenshot included in the model.

3. The method of claim 1, comprising identifying an event related to the first and second screens produced by the application when the application is executed and including information related to the event in the transition information.

4. The method of claim 1, comprising obtaining information related to at least one screenshot and determining a screen associated with the screenshot is stable.

5. The method of claim 1, comprising:
   storing, in association with a screenshot, a parameter;
   detecting a transition from the first screen to the second screen, at least one of the screens related to the screenshot; and
   providing the stored parameter to an external system, the external system to perform an action based on the parameter.

6. The method of claim 1, comprising obtaining a second displayable model and graphically displaying a difference between the model and the second model.

7. The method of claim 1, comprising:
associating a screen produced by the application when the application is executed with a screenshot included in the model;
identifying an event related to the screen; and
determining a subsequent screen expected to be produced by the application based on the event and based on transition information associated with the screenshot.

8. The method of claim 1, comprising:
receiving data related to a plurality of interactions with the application;
relating the data to the model to produce summary information based on the model; and
graphically providing the summary information.

9. The method of claim 1, comprising:
determining a first and second screenshots are related to a screen produced by the application; and
representing the screen in the model based on the first and second screenshots.

10. The method of claim 1, comprising determining in real-time, based on transition information in the model, that a transition from a first to a second screen produced by the application when the application is executed is incompatible with the model.

11. The method of claim 1, comprising:
updating the model based on a received screenshot to generate an updated model; and
graphically displaying a difference between the model and the updated model.

12. The method of claim 1, comprising providing, in real-time, an indication that a screen produced by the application when the application is executed matches a screenshot in the model.

13. The method of claim 1, comprising sorting screenshots included in the model according to at least one attribute and matching the screenshots with a received screenshot according to the sorting.

14. An article comprising a non-transitory computer-readable storage medium, having stored thereon instructions, that when executed on a computer, cause the computer to:
 a. capture a first screenshot of a first screen produced by an application when the application is executed;
 b. capture a second screenshot of a second screen produced by the application when the application is executed, wherein each of the first and second screenshots includes a set of pixel values respectively representing the first and second screens;
 c. if at least one of the first and second screens is not represented, by a screenshot, in a displayable model then store in the displayable model the first and second screenshots and transition information related to a transition from the first screen to the second screen such that the displayable model includes the first and the second screenshots;
 d. if the first and second screens are represented in the displayable model then capturing an additional screenshot of a screen produced by the application when the application is executed and repeating operations b and c; and
 e. use the model to graphically display a flow from the first screen to the second screen.

15. The article of claim 14, wherein the displayable model is an interactive model and wherein the instructions when executed further result in:
displaying a first screenshot included in the model;
capturing an event related to an interaction with the displayed screenshot; and
based on the event and transition information in the model, selecting to present a second screenshot.

16. The article of claim 14, wherein the instructions when executed further result in:
receiving data related to a plurality of interactions with the application;
relating the data to the model to produce summary information based on the model; and
graphically providing the summary information.

17. The article of claim 14, wherein the instructions when executed further result in:
storing, in association with a screenshot, a parameter;
detecting a transition from the first screen to the second screen, at least one of the screens related to the screenshot; and
providing the stored parameter to an external system, the external system to perform an action based on the parameter.

18. The article of claim 14, wherein the instructions when executed further result in obtaining a second displayable model and graphically displaying a difference between the model and the second model.

19. The article of claim 14, wherein the instructions when executed further result in:
associating a screen produced by the application when the application is executed with a screenshot included in the model;
identifying an event related to the screen; and
determining a subsequent screen expected to be produced by the application based on the event and based on transition information associated with the screenshot.

20. The method of claim 1, wherein if the first and second screens are not represented, by a screenshot, in the displayable model then storing, by the controller, in the displayable model the first and second screenshots and transition information related to a transition from the first screen to the second screen such that the displayable model is generated with the first and the second screenshots.

* * * * *